United States Patent [19]

Kauffmann

[11] 4,061,139
[45] Dec. 6, 1977

[54] METHOD AND MEANS FOR PROVIDING PROTECTIVE CLOSURES FOR HIGH VELOCITY APPLICATIONS

[75] Inventor: J. H. Kauffmann, Park Ridge, Ill.

[73] Assignee: F & B Mfg. Co., Chicago, Ill.

[21] Appl. No.: 680,293

[22] Filed: Apr. 26, 1976

[51] Int. Cl.² .................. B23K 21/02; B23K 31/00
[52] U.S. Cl. .................................. 228/107; 72/56; 29/421 E
[58] Field of Search .......... 228/107, 2.5, 108, 109; 72/56; 29/421 E

[56] References Cited

U.S. PATENT DOCUMENTS

| | | | |
|---|---|---|---|
| 3,160,952 | 12/1964 | Corney et al. | 228/107 |
| 3,377,694 | 4/1968 | Simons et al. | 29/421 E |
| 3,863,327 | 2/1975 | Legate | 228/107 |

FOREIGN PATENT DOCUMENTS

| | | | |
|---|---|---|---|
| 655,646 | 1/1963 | Canada | 29/421 E |
| 1,267,068 | 4/1968 | Germany | 29/421 E |
| 1,267,519 | 5/1968 | Germany | 29/421 E |
| 11,381 | 1968 | Japan | 228/107 |
| 12,336 | 1966 | Japan | 228/107 |
| 29,371 | 1971 | Japan | 228/107 |

*Primary Examiner*—Donald G. Kelly
*Assistant Examiner*—Roscoe V. Parker
*Attorney, Agent, or Firm*—Marvin N. Benn

[57] ABSTRACT

A process and product formed therefrom for providing a protective closure for hollow structures that are used in high velocity applications. The protective closure comprises a closure material and a sheath material permanently bond to each other. Both the closure material and the sheath material are "set" in a configuration of the closure. The protective closure is fabricated by having the closure material and the sheath material permanently bonded and "set" to each other by subjecting them to a high energy impulse force.

9 Claims, 2 Drawing Figures

U.S. Patent  Dec. 6, 1977  4,061,139
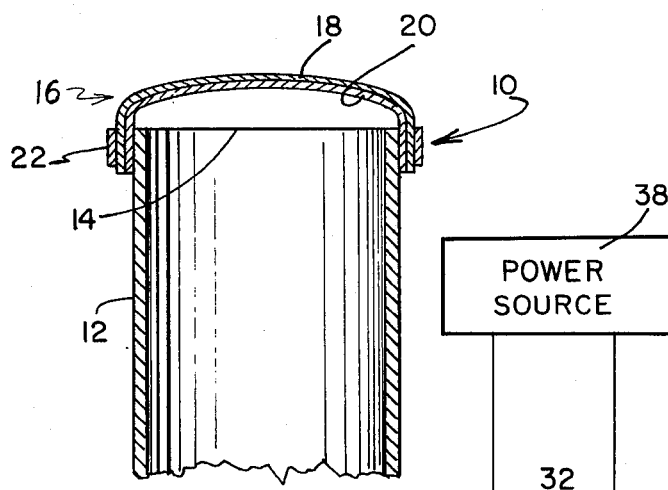
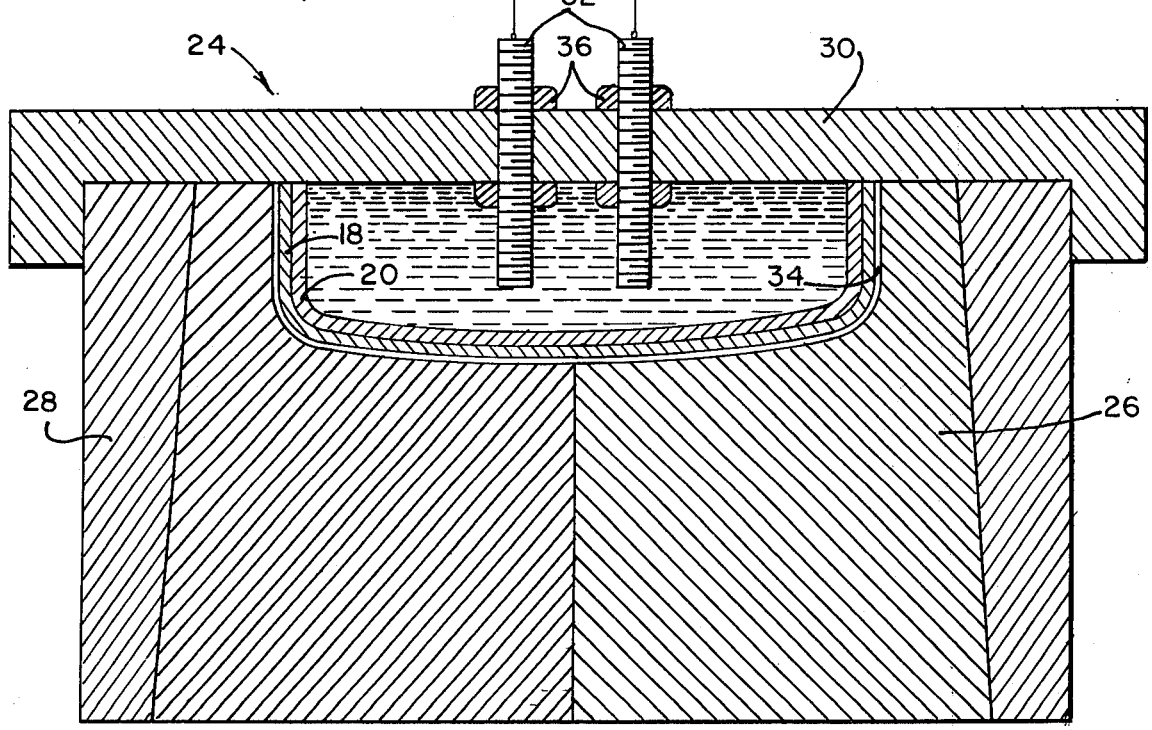

1

METHOD AND MEANS FOR PROVIDING PROTECTIVE CLOSURES FOR HIGH VELOCITY APPLICATIONS

BACKGROUND OF INVENTION

This invention relates generally to closures for hollow structures and more particularly to a protective closure for hollow structures subject to high velocity rotation.

Heretofore, hollow structures used in turbine jet engines, gas turbines and high velocity rotors in the chemical fields and the dairy industries were subject to centrifugal forces which caused material failure and subsequent rupture of their protective closures. These ruptures sometimes create projectiles made up of ruptured pieces of the closure material which have caused extensive damage to adjoining structures. Additionally, such a rupture of a protective closure on a hollow tube or shaft used in, for example, a turbine can cause the loss of the dynamic balance of the turbine resulting in more damage to the turbine and adjoining structures.

Heretofore, protective closures when subjected to high velocities, expand and if the particular closure configuration is eliptical, material failures in the closure occur resulting in the damages described above. When these closures are rotated at high velocities they are subject to both axial stresses (centrifugal force) and hoop stresses. Axial stress generally occurs at the knuckle of the protective closure which is the weakest part of the closure. The loop stress occurs parallel to the longitudinal axis of the shaft, tangential to the wall of the shaft where the closure is coupled. This hoop stress creates bulges in the material of the closure resulting in further imbalance in the entire rotating system.

The metal material used to form these protective closures is basically shaped from rolled sheet material by any one of a number of processes well known in the art. These processes include formation by cold extrusion, hot extrusion, impact extrusion, hydraulic drawing and hydroforming. The protective closures of a single sheet of formed metal shaped by the previously described processes generally have a tendency for the material to attempt to regain or retake its original shape. This "memory" of the material is generally corrected by stress removing the material by the process of restriking or redrawing. But, in high velocity applications, since the memory of these formed materials is not completely destroyed, the formed materials have a tendency to flatten out, resulting in breakage, destortion and especially in high velocity applications, rupturing.

SUMMARY OF THE INVENTION

A fabricating process for forming and bonding a laminated protective closure for an open ended structure by permanently bonding together and setting dissimilar materials. The process comprises the steps of forming a first material undersize to the outside wall of the hollow structure and in the general configuration of the protective closure to be formed. The first formed material is slip-fitted to the second formed material. The first material is permanently bonded to the second material and both materials are set to the configuration of the protective closure to be formed by first, placing the slip-fitted materials in the proximity of a die of the protective closure to be formed and second, destroying the memory of both of the materials by subjecting the slip-fitted materials to a high energy impulse force to force the first material against the second material and force both materials to assume the configuration of the die.

The product prepared in accordance with the previously described process.

A more detailed description of the invention is given in the following specifications and accompanying drawing of which:

FIG. 1 is a cross-sectional view of a closure assembly embodying the invention; and FIG. 2 is a cross-sectional view of an apparatus used in the process embodying the invention.

DESCRIPTION OF THE INVENTION

Referring to FIG. 1, a protective closure assembly for a hollow structure is generally indicated by the reference numeral 10. The closure assembly (10) compises a hollow tube (12) having an end (14) to be protected and a protective closure subassembly (16). The subassembly (16) comprises a sheath material (18) and a closure material (20). Tightening means (22) such as a marmon clamp is coupled to the protective closure subassembly (16) for holding the protective closure subassembly firmly against the outside wall of the hollow structure (12).

The process for forming the closure subassembly (16) can best be described by referring to FIG. 2. The process to be described in conjunction with FIG. 2 unites two dissimilar metals resulting in a permanent set of the materials to each other with approximately a complete loss of memory. Accordingly, when the combination of sheath material (18) and closure material (20) in its assembly (10) are subjected to high velocity rotations, there is less of a tendency for the materials to return to their normal state.

The closure material (20) is first hydroformed undersized to the outside diameter of the wall of the shaft to be protected. Hydroforming is preferred over other forming processes in that the drawing processes have a tendency to stretch the grain of the material being formed. The hydroforming process provides the advantage over other types of forming processes in that the hydroforming process minimizes the thinning of the material being drawn as compared to other forming processes. The process of hydroforming is well known in the art and comprises the steps of placing a blank piece of metal on a draw ring in a hydroforming die. Pressures up to 15,000 psi are applied to the die and the blank metal is forced to comform to the shape of the die. The sheath material (18) is also hydroformed to duplicate the perpendicular wall and the elliptical area of the closure material (20). Both the sheath and closure materials are trimmed to a longer trim length by approximately ½ inch. The hydroformed closure material (20) is slip-fitted into the hydroformed sheath material (18).

Referring to FIG. 2, a die assembly for forming the protective closure subassembly (16) according to the invention is generally indicated by the reference number 24. A split die (26) is provided which is shaped to the configuration to which the protective closure subassembly (16) is to be formed. The slip-fitted hydroformed closure and sheath material combination are placed within the cavity of said die with the hydroformed sheath material (18) between the hydroformed closure material (20) and the die (26). The die is tapered and has a locking ring (28) placed over it. A cover (30) is placed over the top of the tapered die and two electrodes (32) are properly spaced and placed in the cavity of the die. A vacuum is created in the cavity of the die and water is added such that a vacuum exists in the space (34) between the die (26) and the sheath material (18) and the water completed fills up the space remaining in the die cavity. The electrodes (32) are sealed to the cover (30) by sealing means (36) to prevent any air from seeping into the cavity and to prevent water from seeping out. A power source (38) comprising a capacitor bank capable of providing 150,000 kilo-joules of energy is coupled to the electrodes (32).

When the power source (38) is turned on and approximately 150,000 kilo-joules is coupled to the electrodes (32), a spark is created across the electrodes discharging energy. The electrodes and the electrical conducting water act as a transducer. The electrodes (32) are submerged into water and properly spaced such that when the spark is created across the two electrodes, a shock wave is caused to radiate outwards towards the closure material (20). This shock wave or pressure wave can have an energy output of approximately 100,000 foot-pounds. This large shock or pressure wave forces the closure material (20) against the sheath material (18) and both materials are forced against the die (26). Materials (18) and (20) are forced to conform to the shape of the die. The energy of the pressure wave forces the closure and sheath materials to assume the shape of the die (26). The materials (28) and (20) are stretched beyond their elastic limit i.e., set, thereby permanently deforming the material to the exact shape of the die. The materials have in effect loss their memory. The materials are thereby stabilized to the desired configuration of the die. Other methods could be employed to get the desired result. One such method is the process of explosive forming with an explosive charge.

The process described above provides approximately 100 percent surface-to-surface contact bonding between the sheathing material (18) and the closure material (20) resulting in a laminated composite material which is almost inseparable.

The sheathing material (18) need only cover the outside diameter of the closure material and all of the knuckle surface area. The sheathing material does not have to cover the whole of the closure material.

The composition of the closure material (20) used in this process, depending upon the application, is generally comprised of cold rolled steel, allied steel, or high temperature alloys such as "Inconel-718", "Inconel-600", or "Hastalloy".

The composition of the sheath material (18) used in this process is comprised of higher physical properties than the the closure material (20). These properties include higher tensile strength, elongation, rupture, stress rupture, and modulus of elasticity. Examples of such sheath materials that can be used, depending upon the application are "higher tensil stainless steels" ranging downward in tensil strength to various aluminium alloys.

The sheath material's expansion is limited by the die size creating the laminated bond between the two materials. The closure material, being of a more ductile material than the sheath material, therefore, has its expansion limited by the sheath material. The sheath material adheres firmly to the closure material and thereby precluding any fractures in the weakest part of the closure i.e., namely, the knuckle of the closure material. At high velocity rotations, the closure material has a tendency to expand at a greater rate than the sheath material. The greater of the expansion of the closure material the tighter the bond between the sheath material and the closure material resulting in a chain reaction effect. Protective closures formed pursuant to the process described above, results in a closure that can withstand the axial and hoop stresses present during high velocity rotations because of the destruction of the memory of the metal and the additional sheath covering.

What is claimed to be protected by Letters Patent is:

1. A fabricating process for forming and bonding a laminated protective closure for an open ended hollow structure by permanently bonding together and setting dissimilar materials, comprising the steps of:
    a. Forming a first material undersized to the outside wall of said hollow structure and in the general configuration of the protective closure to be formed;
    b. Forming a second material, comprised of higher physical properties than said first material, to the general configuration of the protective closure to be formed;
    c. Slip-fitting said second formed material to said first formed material;
    d. Permanently bonding said first material to said second material and setting said materials to the configuration of the protective closure to be formed by:
        i. Placing said slip-fitted first and second materials in the proximity of a die of the protective closure to be formed;
        ii. Destroying the memory of both said slip-fitted materials by subjecting said slip-fitted materials to a high energy impulse force to force said first material against said second material and force both slip-fitted materials to assume the configurations of the die.

2. The fabricating process described in claim 1 wherein the step of destroying the memory of both said slip-fitted materials includes the steps of creating an explosion by discharging an electrical charge across two electrodes submerged in a liquid in the cavity formed by said die.

3. The fabricating process described in claim 1 wherein the step of destroying the memory of both said slip-fitted materials includes the step of creating an explosion by coupling approximately 150,000 kilojoules to two electrodes submerged in a liquid in the cavity formed by said die.

4. The fabricating process described in claim 1 wherein the step of forming said first material includes the step of hydroforming said first material undersized to the outside wall of said hollow structure in the general configuration of the protective closure to be formed.

5. The fabricating process described in claim 4 wherein the step of forming said second material includes the step of hydroforming said second material of higher physical properties than said first material to the general configuration of the protective closure to be formed.

6. The fabricating process described in claim 5 wherein the step of permanently bonding and setting said first hydroformed material to said second hydroformed material includes the steps of:
    a. Placing said slip-fitted first and second hydroformed materials into the cavity of the said die;
    b. Placing two electrodes within the cavity of said die;
    c. Sealing said die cavity;

d. Creating a vacuum within said die cavity and between said die and said second material;
e. Filling said die cavity with a liquid; and
f. Creating said high energy impulse force by coupling to said electrodes electrical energy of a magnitude to cause an explosion within said cavity.

7. The fabricating process described in claim 6 wherein the step of permanently bonding and setting includes the step of coupling approximately 150,000 kilo-joules to said electrodes.

8. As an article of manufacture, a product prepared in accordance with the process of claim 1.

9. As an article of manufacture, a product prepared in accordance with the process of claim 7.

* * * * *